(12) United States Patent
Tu et al.

(10) Patent No.: US 11,977,719 B2
(45) Date of Patent: May 7, 2024

(54) MODE SETTING METHOD AND DEVICE OF MONITORING SYSTEM

(71) Applicant: OPPLE LIGHTING CO., LTD., Shanghai (CN)

(72) Inventors: Xiaohua Tu, Shanghai (CN); Fei Zhou, Shanghai (CN); Changfu Xue, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 229 days.

(21) Appl. No.: 17/384,067

(22) Filed: Jul. 23, 2021

(65) Prior Publication Data

US 2021/0349588 A1 Nov. 11, 2021

Related U.S. Application Data

(63) Continuation of application No. PCT/CN2019/128017, filed on Dec. 24, 2019.

(30) Foreign Application Priority Data

Jan. 23, 2019 (CN) .......................... 201910065359.X

(51) Int. Cl.
*G06F 3/048* (2013.01)
*G06F 3/0484* (2022.01)
*H04N 7/18* (2006.01)

(52) U.S. Cl.
CPC ........... *G06F 3/0484* (2013.01); *H04N 7/181* (2013.01)

(58) Field of Classification Search
None
See application file for complete search history.

(56) References Cited

U.S. PATENT DOCUMENTS 8,745,532 B2 * 6/2014 Yamao .................. G08C 19/00
715/767
9,839,089 B1 * 12/2017 Wang .................. G06F 3/04847
(Continued)

FOREIGN PATENT DOCUMENTS

CN          1869980 A    11/2006
CN        102053795 A     5/2011
(Continued)

OTHER PUBLICATIONS

International Search Report of PCT Application No. PCT/CN2019/128017 dated Mar. 27, 2020 with English translation, (4p).
(Continued)

*Primary Examiner* — Linh K Pham
(74) *Attorney, Agent, or Firm* — Arch & Lake LLP

(57) ABSTRACT

A mode setting method and a mode setting device for a monitoring system are provided. The mode setting method includes: selecting one or a plurality of monitoring objects; selecting a corresponding display template from preset display templates for each of the one or the plurality of monitoring objects, and associating and packaging each of the one or the plurality of monitoring objects and the selected display template in a one-to-one correspondence, and generating one or a plurality of single display units; selecting a single display unit from the generated single display units according to a monitoring scene; and placing the selected single display unit into a corresponding block of a monitoring interface layout of the monitoring system, and storing the same.

12 Claims, 7 Drawing Sheets

(56) References Cited

U.S. PATENT DOCUMENTS

| | | | |
|---|---|---|---|
| 9,898,168 B2* | 2/2018 | Shapiro | H04L 12/2829 |
| 10,331,767 B1* | 6/2019 | Galante | H04L 67/10 |
| 2007/0106935 A1 | 5/2007 | Su et al. | |
| 2008/0250352 A1* | 10/2008 | Zaliva | G06F 3/0236 |
| | | | 715/816 |
| 2010/0045791 A1 | 2/2010 | Drive et al. | |
| 2010/0217669 A1* | 8/2010 | Gazdzinski | G06F 3/044 |
| | | | 345/173 |
| 2011/0244441 A1* | 10/2011 | Okabayashi | H04N 1/00498 |
| | | | 434/365 |
| 2014/0316584 A1* | 10/2014 | Matsuoka | G05B 15/02 |
| | | | 700/278 |
| 2014/0380234 A1* | 12/2014 | Shim | H04W 4/08 |
| | | | 715/781 |
| 2015/0008845 A1* | 1/2015 | Kim | H05B 47/19 |
| | | | 315/292 |
| 2015/0339018 A1* | 11/2015 | Moon | G06F 3/0482 |
| | | | 715/765 |
| 2016/0085431 A1* | 3/2016 | Kim | H05B 47/10 |
| | | | 715/735 |
| 2017/0230461 A1* | 8/2017 | Verma | H04L 67/10 |
| 2017/0265285 A1* | 9/2017 | Ueno | H05B 45/10 |
| 2017/0308843 A1* | 10/2017 | Iwai | G06Q 30/06 |
| 2018/0145844 A1* | 5/2018 | Pera | H04L 12/2803 |
| 2018/0191517 A1* | 7/2018 | Emigh | G06F 3/04847 |
| 2018/0205567 A1* | 7/2018 | Piaskowski | H04L 12/2827 |
| 2019/0149772 A1* | 5/2019 | Fernandes | G06F 3/0486 |
| | | | 348/159 |
| 2019/0369841 A1* | 12/2019 | Parekh | G06F 3/04815 |
| 2020/0334963 A1* | 10/2020 | Yokoyama | G06F 3/01 |

FOREIGN PATENT DOCUMENTS

| | | |
|---|---|---|
| CN | 103793152 A | 5/2014 |
| CN | 105260346 A | 1/2016 |
| CN | 106100897 A | 11/2016 |
| CN | 106227527 A | 12/2016 |
| CN | 109783707 A | 5/2019 |

OTHER PUBLICATIONS

First Office Action issued to Chinese Application No. 201910065359.X dated Feb. 3, 2021 with English translation, (18p).

* cited by examiner

MODE SETTING METHOD AND DEVICE OF MONITORING SYSTEM

CROSS REFERENCE TO RELATED APPLICATIONS

This application is based upon and claims the priority of PCT patent application No. PCT/CN2019/128017 filed on Dec. 24, 2019 which claims priority of Chinese Patent Application No. 201910065359.X filed on Jan. 23, 2019, the entire disclosures of which are incorporated herein by reference in their entireties for all purposes.

TECHNICAL FIELD

The present disclosure relates to the technical field of a monitoring system, and particularly to a mode setting method and device of a monitoring system.

BACKGROUND

With rapid development of the Internet of Things and an intelligent control technology, a monitoring platform is needed to monitor products and systems. However, currently most of monitoring mode settings are fixed or need to be manually developed and customized, resulting in defects of an existing monitoring system as follows: firstly, the monitoring mode setting cannot be expanded; secondly, diversified monitoring can be implemented by manually carrying out specific development and customization; and thirdly, when monitoring setting is carried out, a special mode setting system is needed.

Therefore, how to achieve an effect of enabling the monitoring setting process to freely select different single modes for setting according to a user's personal wishes so as to make the setting flow more convenient and rapid has become a technical problem urgent to solve currently.

SUMMARY

In view of the above-mentioned problems, the present disclosure proposes a mode setting method and a mode setting device of a monitoring system that overcomes the above-mentioned problems or at least partially solves the above-mentioned problems.

According to one aspect of the present disclosure, a mode setting method of a monitoring system is provided. The mode setting method may include: selecting one or a plurality of monitoring objects; selecting a corresponding display template from preset display templates for each of the one or the plurality of monitoring objects, and associating and packaging each of the one or the plurality of monitoring objects and the selected display template in a one-to-one correspondence, and generating one or a plurality of single display units; selecting a single display unit from the generated single display units according to a monitoring scene; and placing the selected single display unit into a corresponding block of a monitoring interface layout of the monitoring system, and storing the same.

According to another aspect of the present disclosure, a mode setting device for a monitoring system is provided. The mode setting device of the monitoring system may include a monitoring object selecting module, adapted to select one or a plurality of monitoring objects; a display template associating module, adapted to select a corresponding display template from preset display templates for each of the one or the plurality of monitoring objects, and associate and package each monitoring object and the selected display template in a one-to-one correspondence, and generate one or a plurality of single display units; a display unit selecting module, adapted to select a single display unit from the generated single display units according to a monitoring scene; and a display unit distributing module, adapted to place the selected single display unit into a corresponding block of a monitoring interface layout of the monitoring system, and store the same.

The above description is only an overview of the technical solution of the present disclosure. In order to understand the technical means of the present disclosure more clearly, it can be implemented in accordance with the content of the specification, and in order to make the above and other objectives, features and advantages of the present disclosure more obvious and easy to understand, the following, specific embodiments of the present disclosure will be provided.

Based on the following detailed description of specific embodiments of the present disclosure in conjunction with the accompanying drawings, those skilled in the art will better understand the above and other objectives, advantages and features of the present disclosure.

BRIEF DESCRIPTION OF THE DRAWINGS

By reading the detailed description of the embodiments below, various other advantages and benefits will become clear to those ordinary skilled in the art. The drawings are only used for the purpose of illustrating the embodiments, and are not considered as a limitation to the present disclosure. Also, throughout the drawings, the same reference signs are used to denote the same components. In the drawings.

DETAILED DESCRIPTION

Hereinafter, an exemplary embodiment of the present disclosure will be described in more detail with reference to the accompanying drawings. Although the accompanying drawings show the exemplary embodiment of the present disclosure, it should be understood that the present disclosure may be implemented in various forms and should not be limited by the embodiment described herein. On the contrary, these embodiments are provided for a more thorough understanding of the present disclosure and to fully convey the scope of the present disclosure to those skilled in the art.

In a prior art, a fixed monitoring setting mode has problems that monitoring setting cannot be expanded and cannot meet a user's personalized setting requirements. In order to implement diversified monitoring and display, manual development and customization is needed, and the monitoring setting needs a specific mode setting system, which greatly increases the cycle cost and labor cost of project development.

Figure 1:
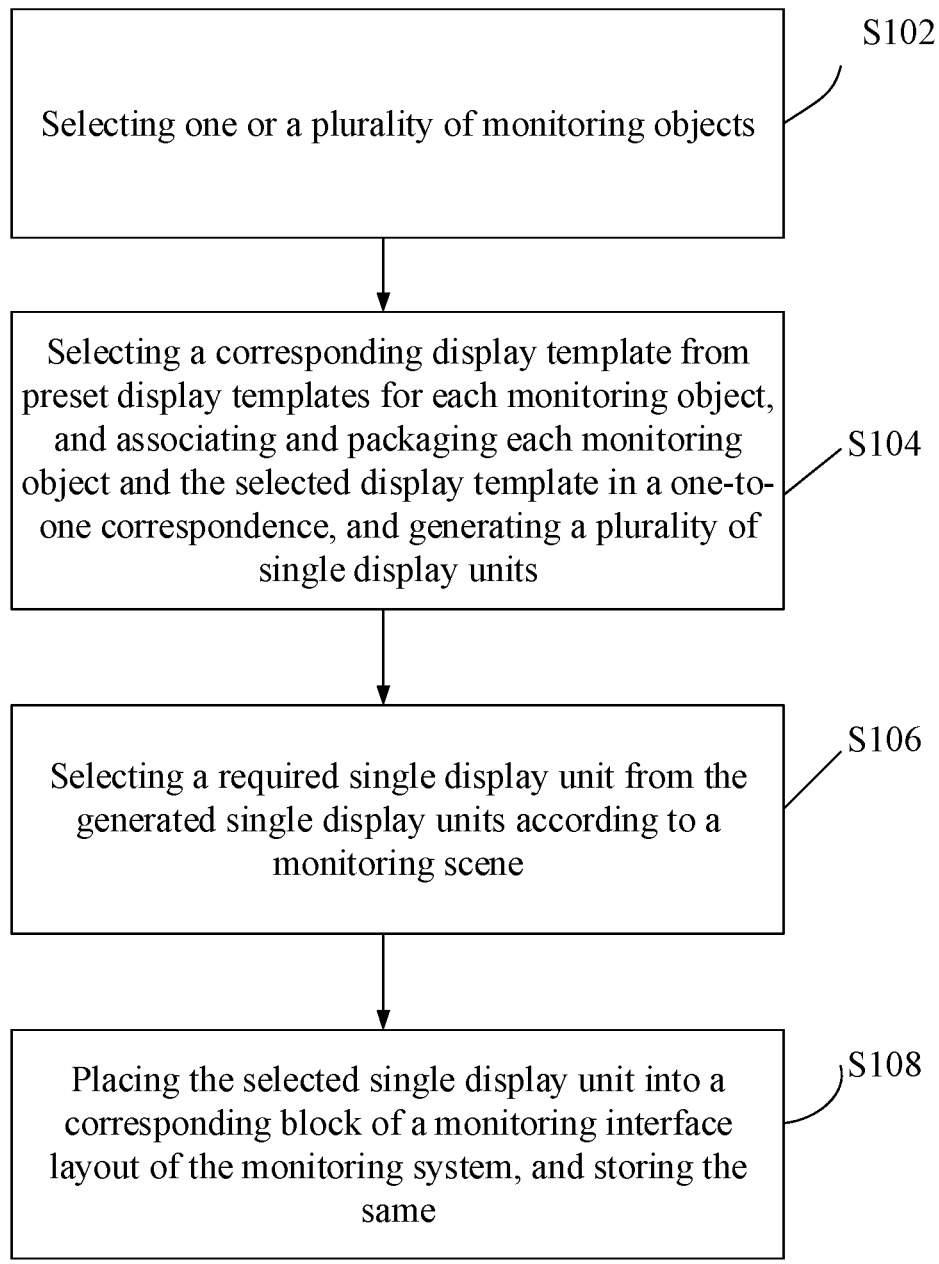
FIG. 1 shows a flow chart of a mode setting method of a monitoring system according to an embodiment of the present disclosure.

In order to solve the technical problems above, an embodiment of the present disclosure provides a mode setting method of a monitoring system. FIG. 1 shows a flow chart of a mode setting method of a monitoring system according to an embodiment of the present disclosure. With reference to FIG. 1, the method at least may include the following steps S102 to S108.

In the step S102, selecting one or a plurality of monitoring objects.

In the step S104, selecting a corresponding display template from preset display templates for each monitoring object, and associating and packaging each monitoring object and the selected display template in a one-to-one correspondence, and to generate one or a plurality of single display units.

In the step S106, selecting a required single display unit from the generated single display units according to a monitoring scene.

In the step S108, placing the selected single display unit into a corresponding block of a monitoring interface layout of the monitoring system, and storing it.

In the mode setting method of the monitoring system, which is provided by the embodiment of the present disclosure, integrated setting of a monitoring mode is implemented by a single display unit setting manner and a group layout of a monitoring interface. Meanwhile, systematized and standardized management of the monitoring mode setting flow is implemented, the user's personalized setting requirements are met, and diversification of the monitoring display mode can be uniformly managed and controlled, so that project development is accelerated, and the cycle cost of development is reduced.

In the step S102 above, the monitoring object may be a state indicator of a to-be-monitored target (e.g., a to-be-monitored product, system and the like). For example, in a monitoring scene in which the to-be-monitored target is an office building, the monitoring object may include at least one of temperature, humidity, illuminance, the number of personnel, a sign of personnel activity and the like of a specific region (e.g., an office region, an experiment region and the like).

The display template mentioned in the step S104 above is a preset standardized template for displaying monitoring data. Optionally, the display template may include at least one of a curve chart, a histogram, a pie graph, an instrument panel, an information panel, a data report and the like.

The curve chart may display a variation trend of the monitoring data and comparison among a plurality of pieces of comparison data by setting a specific coordinate axis, a color and legend of a curve, a label color, a numerical value typeface and the like. The histogram may display the variation trend of the monitoring data and comparison among a plurality of pieces of comparison data by setting a transverse axis label, a histogram color of the histogram, a width, a gap, a legend, a label, a numerical value, a typeface size and the like. The pie graph may display a size of each item and a proportion of the sum of each item in a monitoring data series by setting a dividing color, a label format and color, a typeface size, a legend and the like. The instrument panel is a data visualized report type, and may display the monitoring data by setting a subject name, indicator selection, a threshold and the like, so that the range of monitoring indicator value can be clearly seen. The information panel may display the monitoring data by setting title editing, indicator selection, panel content, underpainting, a typeface, line spacing and the like. The data report may display the monitoring data by setting indicator field, a paging line number, a typeface size and the like.

The monitoring objects and the corresponding display templates are subjected to associating and packaging to generate a single display unit (which may as well be understood as a single card capable of being freely inserted into the monitoring interface layout or taken out from the monitoring interface layout) so as to facilitate freely selecting different single display units to set the monitoring mode according to the requirement of the monitoring scene in the subsequent step S106.

In an alternative embodiment of the present disclosure, a new display template also may be added into the preset display templates according to the requirement of the monitoring scene. Therefore, expandability of the display templates is implemented. When the current preset display templates cannot meet specific requirements of the monitoring scene and/or a user, new single display unit is generated by subsequently updating and expanding the display template so as to facilitate implementing subsequent management of expansion, maintenance, charging and the like on the display templates and the single display units, thereby further adapting to different monitoring scenes and the specific requirements better.

In the step S108 above, the display template of the single display unit placed into the corresponding block of the monitoring interface layout of the monitoring system can be adapted to the size of the block to be scaled, so as to ensure an excellent monitoring data display effect.

In an alternative embodiment of the present disclosure, after the step S108 is executed, a step of allocating a monitoring permission of each block in the monitoring interface layout to monitoring personnel also may be executed, so as to implement management and control on the monitoring permission and ensure a monitoring effect. In the practical application, the monitoring permission of each block may be respectively allocated to different monitoring personnel, also may be uniformly allocated to the same monitoring personnel, specifically, it is determined according to the requirements of the monitoring scene and business requirements, and the present disclosure does not make any limit to it.

In an alternative embodiment of the present disclosure, before the step S108 is executed, a step below also may be executed:

Selecting one monitoring interface layout from a pre-generated monitoring interface layout template according to the monitoring scene to serve as the monitoring interface layout of the monitoring system.

Figure 2:
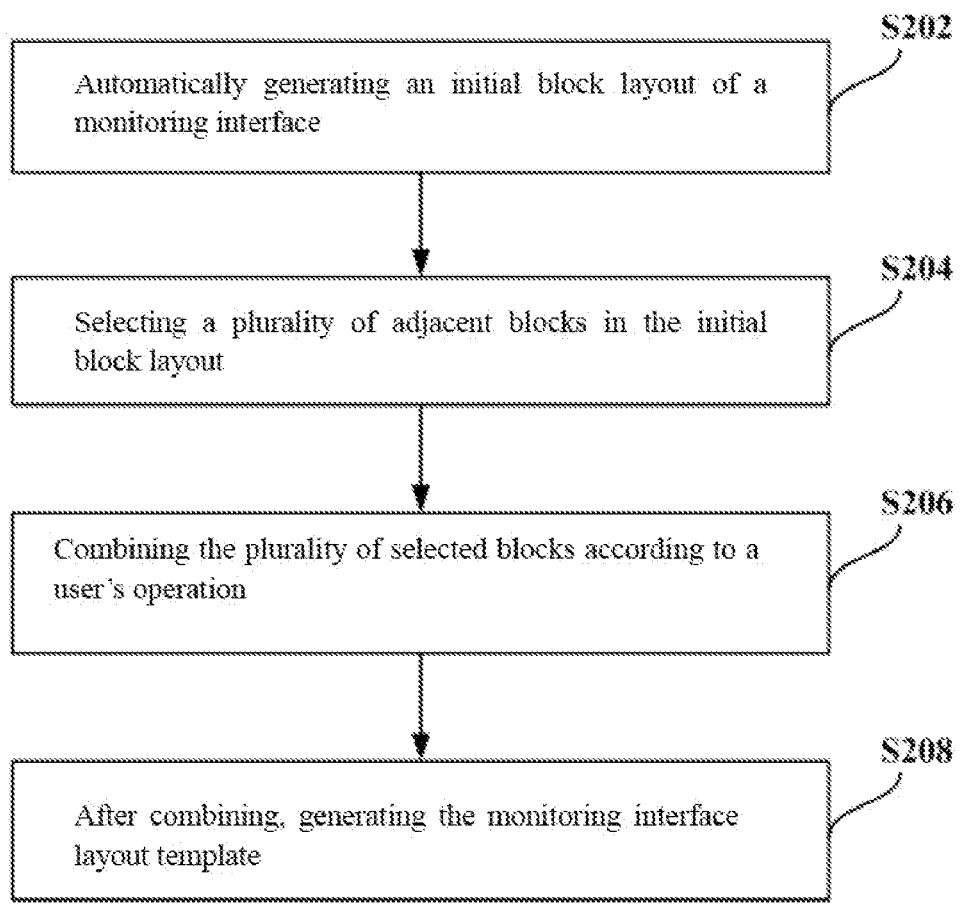
FIG. 2 shows a flow chart of a step of generating a monitoring interface layout template according to an embodiment of the present disclosure.

Further, the pre-generated monitoring interface layout template may be generated by the following steps as shown in FIG. 2:

S201: automatically generating an initial block layout of a monitoring interface;

S202: selecting a plurality of adjacent blocks in the initial block layout;

S203: combining the plurality of selected blocks according to the user's operation; and S204: after combining, generating the monitoring interface layout template.

By selecting the monitoring interface layout template generated after the user carries out customization layout on the monitoring interface to serve as the monitoring interface layout of the monitoring system and placing the selected single display unit into the monitoring interface layout to complete setting of the monitoring mode, the set monitoring system can be further adapted to different monitoring scenes and the specific requirements.

The monitoring interface layout is the designation on a display range of the monitoring data display template, and for example, an irregular pattern, such as an L shape, a curved shape and the like, is unbeneficial to excellent display of the monitoring data, and thus, further, before the plurality of selected blocks are combined, a step below also may be executed:

Determining whether the plurality of selected blocks can be combined into an m*n type regular pattern, where m and n are positive integers; and if yes, combining the plurality of selected blocks. Herein, m and n may be equal, or unequal, and for example, the m*n type regular pattern may be of a 3*1 type strip shape, or a 2*2 type square shape and the like.

Preferably, in order to provide a more friendly operation interface to the user so as to facilitate operation of the user, after it is determined that the plurality of selected blocks can be combined into the m*n type regular pattern, a combining determination function button and a combining canceling function button also may be provided. Then, in response to the user's clicking operation on the combining determination function button, the plurality of selected blocks are combined, or in response to the user's clicking operation on the combining canceling function button, combining on the plurality of selected blocks is abandoned.

if it is determined that the plurality of selected blocks cannot be combined into the m*n type regular pattern, prompt information not meeting the combining requirement is displayed so as to remind the user to reselect and improve effectiveness and efficiency of customization layout.

In addition, when the user carries out customization layout, there may be a requirement for splitting the combined blocks and combining again. Therefore, after the plurality of selected blocks are combined, the mode setting method further may include:

In response to the user's backspacing operation, separating the combined blocks into initial blocks.

A block separating function is convenient for the user to combine the processed blocks again.

Figure 3:
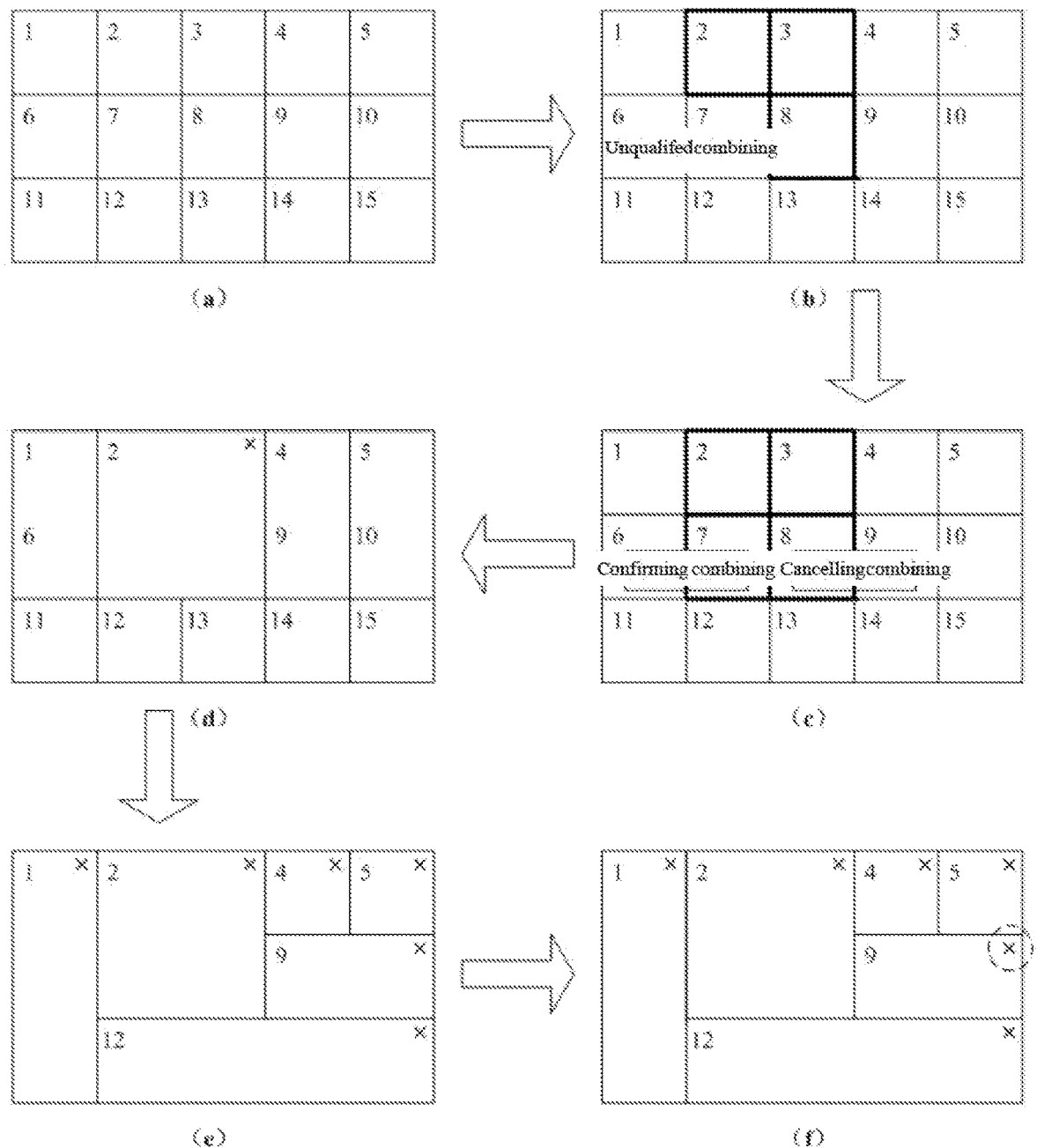
FIG. 3 shows a schematic diagram of an operation of generating a monitoring interface layout template according to an embodiment of the present disclosure.

FIG. 3 shows a schematic diagram of an operation of generating the monitoring interface layout template according to an embodiment of the present disclosure. As shown in FIG. 3, (a) represents an initial block layout of a monitoring interface automatically generated by an initial layout assembly, wherein the monitoring interface has 15 initial blocks with reference signs 1 to 15. (b) represents a case of displaying the prompt information not meeting the combining requirement when determining that the selected adjacent blocks 2, 3 and 8 in the initial block layout cannot be combined into the m*n type regular pattern, wherein the prompt information specifically is text information of "unqualified combining". In the practical operation, when the user's clicking operation on the prompt information is received, the prompt information may automatically disappear, and the user may continue to carry out the subsequent operation. (c) represents a case of providing the combining determination function button and the combining canceling function button when determining that the selected adjacent blocks 2, 3, 7 and 8 in the initial block layout can be combined into the m*n type regular pattern. (d) represents the monitoring interface layout generated by combining the plurality of selected blocks after receiving the user's clicking operation on the combining determination function button. (e) represents the monitoring interface layout template generated after combining is all completed. (f) represents a schematic diagram of a backspacing operation when the user needs to separate the combined blocks. Specifically, the backspacing operation is implemented by clicking an icon button "X" marked in a dotted circle in (f). It should be noted that the icon button for implementing the backspacing operation may be set for each block obtained after combining so as to achieve separating each block obtained after combining into the initial blocks, or the icon button for implementing the backspacing operation also may be set for the integral monitoring interface, so that the integral monitoring interface can be backspaced to the initial block layout.

In FIG. 3, the number and the reference signs of the blocks in the initial block layout of the monitoring interface are merely schematic, but are not limitative of the present disclosure.

The above illustrates various implementation manners of each link of the embodiment shown in FIG. 1, and the implementing process of the mode setting method of the monitoring system according to the present disclosure will be illustrated in detail below by specific embodiments.

Figure 4:
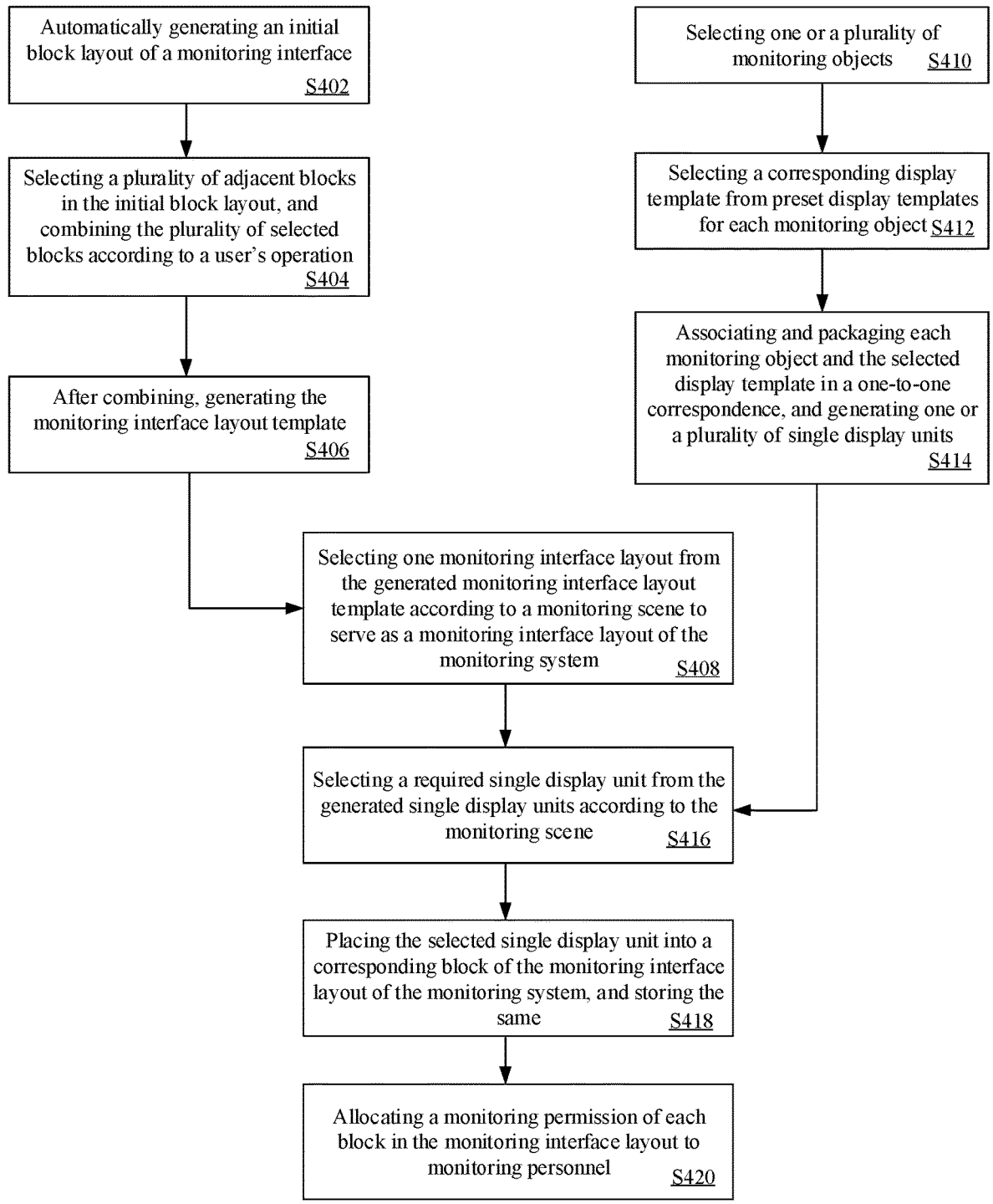
FIG. 4 shows a flow chart of a mode setting method of a monitoring system according to another embodiment of the present disclosure.

FIG. 4 shows a schematic flow chart of a mode setting method of a monitoring system according to a specific embodiment of the present disclosure. With reference to FIG. 4, the method may include steps S402 to S420.

In the step S402, automatically generating an initial block layout of a monitoring interface.

In the step S404, selecting a plurality of adjacent blocks in the initial block layout, and combining the plurality of selected blocks according to the user's operation.

In the step S406, after combining, generating a monitoring interface layout template.

In the S408, selecting one monitoring interface layout as a monitoring interface layout of the monitoring system from the generated monitoring interface layout template according to a monitoring scene.

In the embodiment, the monitoring scene is a scene in which an office building is monitored.

In the step S410, selecting one or a plurality of monitoring objects.

In the embodiment, the monitoring objects include temperature, humidity, illuminance, number of personnel, signs of personnel activity and the like in a specific region (e.g., an office region, an experiment region and the like) of the office building.

In the step S412, selecting a corresponding display template from preset display templates for each monitoring object.

In the embodiment, the display template includes at least one of a curve chart, a histogram, a pie graph, an instrument panel, an information panel, a data report and the like.

In the step S414, associating and packaging each monitoring object and the selected display template in a one-to-one correspondence, to generate one or a plurality of single display units.

In the step S416, selecting a required single display unit from the generated single display units according to the monitoring scene.

In the step S418, placing the selected single display unit into a corresponding block of the monitoring interface layout of the monitoring system, and storing it.

In the step, the display template of the single display unit placed into the corresponding block of the monitoring interface layout of the monitoring system can be adapted to the size of the block to be scaled.

In the step S420, allocating a monitoring permission of each block in the monitoring interface layout to monitoring personnel.

It should be noted that in the embodiment, an order of the selecting step of the monitoring interface layout and the selecting step of the single display unit are interchangeable.

Figure 5:
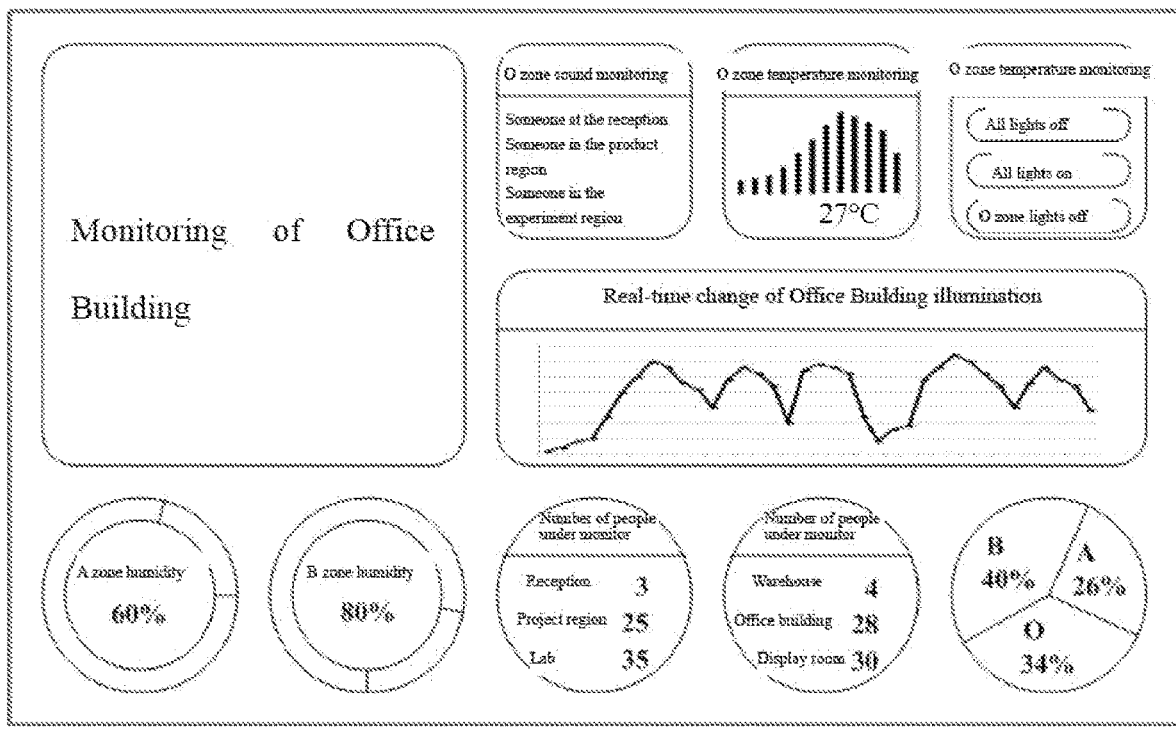
FIG. 5 shows a schematic diagram of a monitoring interface presented after monitoring mode setting is carried out according to an embodiment of the present disclosure.

FIG. 5 shows a schematic diagram of a monitoring interface presented after monitoring mode setting is carried out according to an embodiment of the present disclosure.

According to the embodiments of the present disclosure, systematized management of the monitoring mode setting flow is implemented, the user's personalized setting requirements are better met by customized layout of the monitoring interface, setting of the single display unit and group layout setting of the monitoring interface, and different monitoring scenes and specific business requirements can be adapted.

Figure 6:
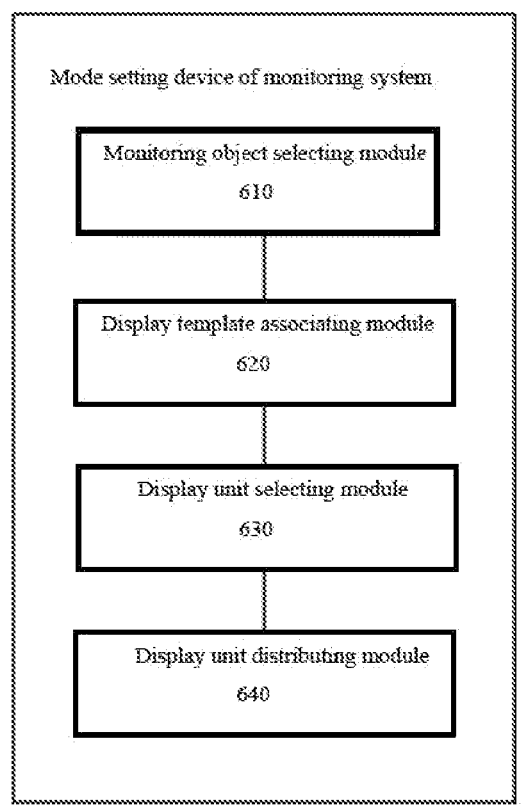
FIG. 6 shows a structural schematic diagram of a mode setting device of a monitoring system according to an embodiment of the present disclosure.

Based on a same inventive concept, an embodiment of the present disclosure further provides a mode setting device for a monitoring system for supporting the mode setting method of the monitoring system, which is provided by any one or a combination of the above-mentioned embodiments. FIG. 6 shows a structural schematic diagram of a mode setting device for a monitoring system according to an embodiment of the present disclosure. With reference to FIG. 6, the device at least may include: a monitoring object selecting module 610, a display template associating module 620, a display unit selecting module 630 and a display unit distributing module 640.

Functions of each component or device and a connection relationship between each part of the mode setting device for the monitoring system according to the embodiment of the present disclosure will be illustrated at present:

The monitoring object selecting module 610 is adapted to select one or a plurality of monitoring objects.

The display template associating module 620 is connected with the monitoring object selecting module 610, and is adapted to select a corresponding display template from preset display templates for each monitoring object, and associate and package each monitoring object and the selected display template in a one-to-one correspondence and generate one or a plurality of single display units.

The display unit selecting module 630 is connected with the display template associating module 620, and is adapted to select a single display unit from the generated single display units according to a monitoring scene.

The display unit distributing module 640 is connected with the display unit selecting module 630, and is adapted to place the selected single display unit into a corresponding block of a monitoring interface layout of the monitoring system, and store the same.

In an alternative embodiment of the present disclosure, the display template may include at least one of:

A curve chart, a histogram, a pie graph, an instrument panel, an information panel, and a data report.

Figure 7:
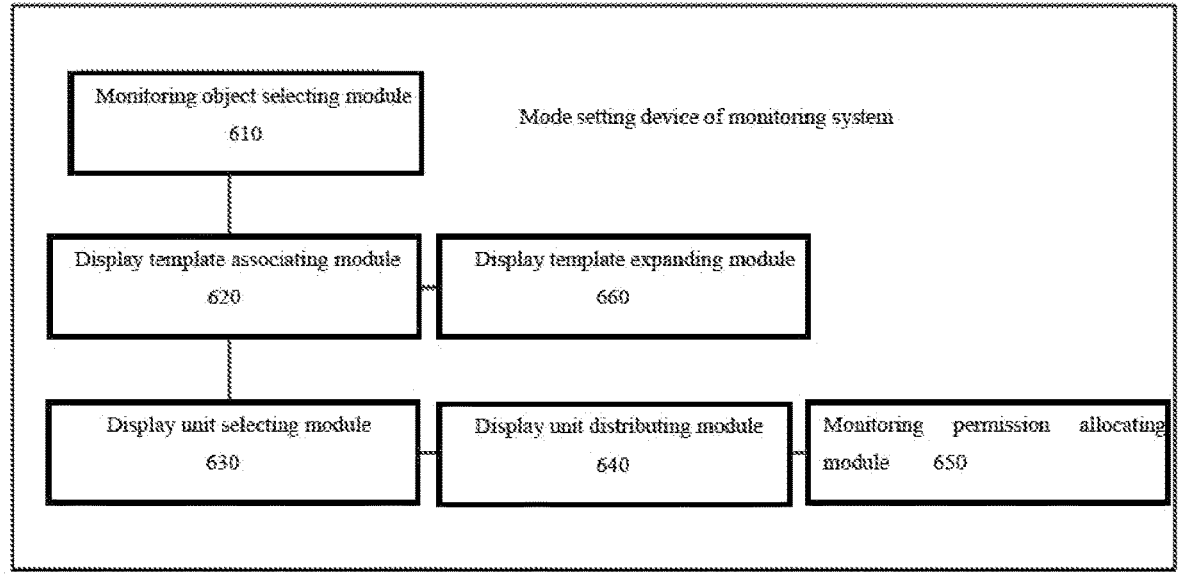
FIG. 7 shows a structural schematic diagram of a mode setting device of a monitoring system according to another embodiment of the present disclosure.

In an alternative embodiment of the present disclosure, as shown in FIG. 7, the mode setting device for the monitoring system, which is shown in FIG. 6, may further include a monitoring permission allocating module 650. The monitoring permission allocating module 650 may be connected with the display unit distributing module 640, and is adapted to, after the display unit distributing module 640 places the selected single display unit into the corresponding block of the monitoring interface layout of the monitoring system and store the same, allocate a monitoring permission of each block in the monitoring interface layout to monitoring personnel.

In an alternative embodiment of the present disclosure, still with reference to FIG. 7, the mode setting device for the monitoring system may further include a display template expanding module 660. The display template expanding module 660 may be connected with the display template associating module 620, and is adapted to add a new display template into the preset display templates according to the requirement of the monitoring scene.

Figure 8:
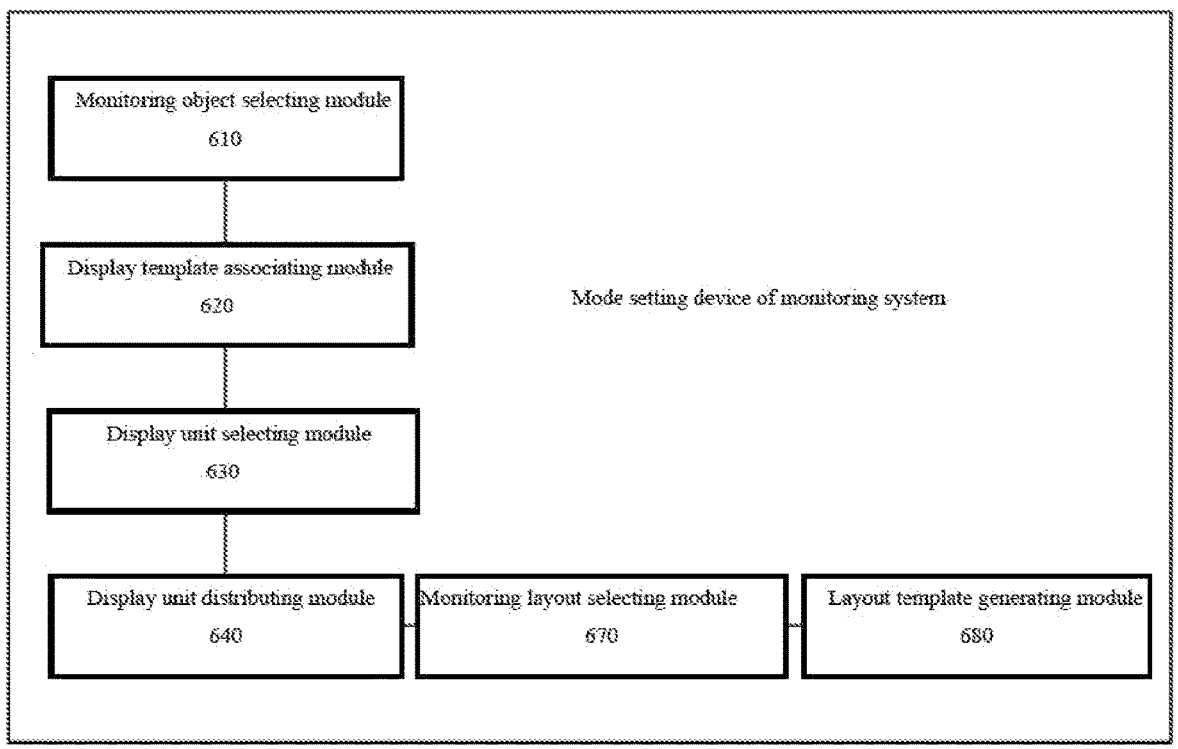
FIG. 8 shows a structural schematic diagram of a mode setting device of a monitoring system according to yet another embodiment of the present disclosure.

In an alternative embodiment of the present disclosure, as shown in FIG. 8, the mode setting device for the monitoring system, which is shown in FIG. 6, may further include a monitoring layout selecting module 670. The monitoring layout selecting module 670 may be connected with the display unit distributing module 640, and is adapted to, before the display unit distributing module 640 places the selected single display unit into the corresponding block of the monitoring interface layout of the monitoring system, select one monitoring interface layout from a pre-generated monitoring interface layout template according to the monitoring scene to serve as the monitoring interface layout of the monitoring system.

Further, still with reference to FIG. 8, the mode setting device for the monitoring system may further include a layout template generating module 680. The layout template generating module 680 may be connected with the monitoring layout selecting module 670, and is adapted to, before the monitoring layout selecting module 670 selects one monitoring interface layout from the pre-generated monitoring interface layout template according to the monitoring scene to serve as the monitoring interface layout of the monitoring system, automatically generate an initial block layout of a monitoring interface;

Select a plurality of adjacent blocks in the initial block layout;

combine the plurality of selected blocks according to a user's operation; and

After combining, generate the monitoring interface layout template.

In an alternative embodiment of the present disclosure, the layout template generating module 680 is further adapted to:

Before combining, determine whether the plurality of selected blocks can be combined into an m*n type regular pattern, where m and n are positive integers; and If yes, combine the plurality of selected blocks.

In an alternative embodiment of the present disclosure, the layout template generating module 680 is further adapted to:

under a condition that the plurality of selected blocks are determined to be capable of combining into the m*n type regular pattern, provide a combining determination function button and a combining canceling function button;

In response to the user's clicking operation on the combining determination function button, combine the plurality of selected blocks; or In response to the user's clicking operation on the combining canceling function button, abandon combining of the plurality of selected blocks.

In an alternative embodiment of the present disclosure, the layout template generating module 680 is further adapted to:

under a condition that the plurality of selected blocks are determined not to be combined into the m*n type regular pattern, display prompt information not meeting the combining requirement.

In an alternative embodiment of the present disclosure, the layout template generating module 680 is further adapted to:

After the plurality of selected blocks are combined, in response to the user's backspacing operation, separate the combined blocks into initial blocks.

According to any one of the alternative embodiments above or a combination of a plurality of alternative embodiments, the embodiments of the present disclosure can achieve beneficial effects below:

According to the mode setting method and device for the monitoring system, which are provided by the embodiments of the present disclosure, firstly, the monitoring object is selected, and the monitoring object and the corresponding display template selected from the preset display templates are associated and packaged in a one-to-one correspondence, to generate one or a plurality of single display units; and then the required single display unit is selected from the generated single display units according to the requirement of the monitoring scene, the selected single display unit is placed into the corresponding block of the monitoring interface layout of the monitoring system, and stored, so that integrated setting of the monitoring mode is implemented by the single display unit setting manner and the group layout of the monitoring interface. Meanwhile, systematized and standardized management of the monitoring mode setting flow is implemented, the user's personalized setting requirements are met, and diversification of the monitoring display mode can be uniformly managed and controlled, so that project development is accelerated, and the cycle cost of development is reduced.

p Further, according to the solutions of the embodiments of the present disclosure, the new single display template also can be added into the preset display templates according to the requirement of the monitoring scene, so as to facilitate subsequently updating and expanding the single display unit and greatly facilitate implementing subsequent management of expansion, maintenance, charging and the like on the display templates and the single display units.

Further, according to the solutions of the embodiments of the present disclosure, one monitoring interface layout also can be selected from the pre-generated monitoring interface layout template according to the requirement of the monitoring scene to serve as the monitoring interface layout of the monitoring system, wherein the pre-generated monitoring interface layout template is generated by freely combining and splitting of the blocks by an user according to the user's personalized requirement on the basis of the initial block layout of the monitoring interface. By carrying out customization layout on the monitoring interface, the monitoring interface is further adapted to different monitoring scenes and the specific requirements.

In the solution of the present disclosure, integrated setting of the monitoring mode is implemented by the single display unit setting manner and the group layout of the monitoring interface. Meanwhile, systematized and standardized management of the monitoring mode setting flow is implemented, the user's personalized setting requirements are met, and diversification of the monitoring display mode can be uniformly managed and controlled, so that project development is accelerated, and the cycle cost of development is reduced. Those skilled in the art can clearly know that for the specific working processes of the above-described system, device and unit, the corresponding processes in the above-mentioned method embodiments may be referred to, which will not be repeated herein for brevity.

Optionally, the display template comprises at least one of: a curve chart, a histogram, a pie graph, an instrument panel, an information panel, and a data report.

Optionally, after placing the selected single display unit into the corresponding block of the monitoring interface layout of the monitoring system and storing the same, the method further comprises:

allocating a monitoring permission of each block in the monitoring interface layout to monitoring personnel.

Optionally, the method further comprises:

adding a new display template into the preset display templates according to a requirement of the monitoring scene.

Optionally, before placing the selected single display unit into the corresponding block of the monitoring interface layout of the monitoring system, the method further comprises:

selecting one monitoring interface layout from a pre-generated monitoring interface layout template according to the monitoring scene to serve as the monitoring interface layout of the monitoring system.

Optionally, the pre-generated monitoring interface layout template is generated by steps of:

automatically generating an initial block layout of a monitoring interface;

selecting a plurality of adjacent blocks in the initial block layout;

combining the plurality of selected blocks according to a user's operation; and after combining, generating the monitoring interface layout template.

Optionally, before combining, the method further comprises:

determining whether the plurality of selected blocks are capable of combining into an m*n type regular pattern, where m and n are positive integers; and if yes, combining the plurality of selected blocks.

Optionally, the combining the plurality of selected blocks comprises:

providing a combining determination function button and a combining canceling function button;

in response to a clicking operation of the user on the combining determination function button, combining the plurality of selected blocks; or in response to a clicking operation of the user on the combining canceling function button, abandoning combining of the plurality of selected blocks.

Optionally, the method further comprises:

under a condition that the plurality of selected blocks are determined not to be combined into the m*n type regular pattern, displaying prompt information not meeting a combining requirement.

Optionally, after combining the plurality of selected blocks, the method further comprises:

in response to a backspacing operation of the user, separating the combined blocks into initial blocks.

Optionally, the display template comprises at least one of: a curve chart, a histogram, a pie graph, an instrument panel, an information panel, and a data report.

Optionally, the mode setting device further comprises:

a monitoring permission allocating module, adapted to, after the display unit distributing module places the selected single display unit into the corresponding block of the monitoring interface layout of the monitoring system and stores the same, allocate a monitoring permission of each block in the monitoring interface layout to monitoring personnel.

Optionally, the mode setting device further comprises:

a display template expanding module, adapted to add a new display template into the preset display templates according to a requirement of the monitoring scene.

Optionally, the mode setting device further comprises:

a monitoring layout selecting module, adapted to, before the display unit distributing module places the selected single display unit into the corresponding block of the monitoring interface layout of the monitoring system, select one monitoring interface layout from a pre-generated monitoring interface layout template according to the monitoring scene to serve as the monitoring interface layout of the monitoring system.

Optionally, the mode setting device further comprises:

a layout template generating module, adapted to, before the monitoring layout selecting module selects one monitoring interface layout from the pre-generated monitoring interface layout template according to the monitoring scene to serve as the monitoring interface layout of the monitoring system, automatically generate an initial block layout of a monitoring interface;

select a plurality of adjacent blocks in the initial block layout;

combine the plurality of selected blocks according to a user's operation; and after combining, generate the monitoring interface layout template.

Optionally, the layout template generating module is further adapted to:

before combining, determine whether the plurality of selected blocks are capable of combining into an m*n type regular pattern, where m and n are positive integers; and if yes, combine the plurality of selected blocks.

Optionally, the layout template generating module is further adapted to:

provide a combining determination function button and a combining canceling function button;

in response to a clicking operation of the user on the combining determination function button, combine the plurality of selected blocks; or in response to a clicking operation of the user on the combining canceling function button, abandon combining of the plurality of selected blocks.

Optionally, the layout template generating module is further adapted to:

under a condition that the plurality of selected blocks are determined not to be combined into the m*n type regular pattern, display prompt information not meeting a combining requirement.

Optionally, the layout template generating module is further adapted to:

after the plurality of selected blocks are combined, in response to a backspacing operation of the user, separate the combined blocks into initial blocks.

In the mode setting method and the mode setting device of a monitoring system provided by an embodiment of the present disclosure, a monitoring object is firstly selected, the monitoring object and a corresponding display template selected from preset display templates are associated and packaged in a one-to-one correspondence, and one or a plurality of single display units are generated; further, a required single display unit is selected from the generated single display units according to a monitoring scene, and the selected single display unit is placed into a corresponding block of a monitoring interface layout of the monitoring system, and is stored, so that integrated setting of a monitoring mode is implemented by a single display unit setting manner and a group layout of a monitoring interface. Meanwhile, systematized and standardized management of the monitoring mode setting flow is implemented, the user's personalized setting requirements are met, and diversification of the monitoring display mode can be uniformly managed and controlled, so that project development is accelerated, and the cycle cost of development is reduced.

Further, the solution provided by an embodiment of the present disclosure can add a new display template into the preset display templates according to the requirement of the monitoring scene, so as to facilitate subsequently updating and expanding the single display unit and greatly facilitate implementing subsequent management of expansion, maintenance, charging and the like on the display templates and the single display units.

Further, according to the solutions of the embodiments of the present disclosure, one monitoring interface layout also can be selected from the pre-generated monitoring interface layout template according to the requirement of the monitoring scene to serve as the monitoring interface layout of the monitoring system, wherein the pre-generated monitoring interface layout template is generated by freely combining and splitting of the blocks by an user according to the user's personalized requirement on the basis of the initial block layout of the monitoring interface. By carrying out customization layout on the monitoring interface, the monitoring interface is further adapted to different monitoring scenes and the specific requirements.

In addition, each function unit in each embodiment of the present disclosure may be physically independent of each other, or two or more function units may be integrated together, or all the function units may be integrated into one processing unit. The integrated function unit not only may be implemented in a hardware form, but also may be implemented in a software or firmware form.

Those ordinary skilled in the art should understand that: if the integrated function unit is implemented in the software form and is sold or used as an independent product, the integrated function unit may be stored in a computer readable storage medium. Based on such understanding, the technical solutions of the present disclosure in essence or all or part of the technical solutions may be embodied in a form of a software product, the computer software product is stored in one storage medium and includes a plurality of instructions for enabling one computing device (e.g., a personal computer, a server, or a network device and the like) to execute all or part of the steps in the method according to each embodiment of the present disclosure when operating the instructions. The above-mentioned storage mediums include various mediums capable of storing program codes, such as a USB flash disk, a mobile hard disk, a Read Only Memory (ROM), a Random Access Memory (RAM), a magnetic disk or an optical disc and the like.

Or, implementation of all or part of the steps in the above-mentioned method embodiments may be completed by hardware (the computing device such as the personal computer, the server or the network device and the like) related to program instructions, and the program instructions may be stored in a computer readable storage medium, and when the program instructions are executed by a processor of the computing device, the computing device executes all or part of the steps in the method according to each embodiment of the present disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Finally, it should be noted that the above embodiments are only used to illustrate the technical solution of the present disclosure, are not limitative to the present disclosure; although the present disclosure has been described in detail with reference to the foregoing embodiments, those ordinary skilled in the art should understand that: within the spirit and principle of the present disclosure, it is still possible to modify the technical solutions in the foregoing embodiments, or equivalently replace a portion or all of the technical features; and these modifications or replacements do not make the corresponding technical solutions to depart from the protection scope of the present disclosure.

The invention claimed is:

1. A mode setting method, comprising:
selecting, by a monitoring system, one or a plurality of monitoring objects, said monitoring objects including humidity, temperature, the number of personnel, a sign of personnel activity;
selecting, by the monitoring system, a corresponding display template from preset display templates for each of the one or the plurality of monitoring objects, and associating and packaging each of the one or the plurality of monitoring objects and the selected display template in a one-to-one correspondence, and generating one or a plurality of single display units;
selecting, by the monitoring system, a single display unit from the generated single display units according to a monitoring scene;
automatically generating an initial block layout of a monitoring interface;
selecting a plurality of adjacent blocks in the initial block layout;
combining the plurality of selected blocks according to a user's operation;
in response to receiving a backspacing operation of the user, separating the combined blocks into initial blocks by implementing the backspacing operation to each block, so as to separate each block obtained after combining into the initial blocks;
generating a monitoring interface layout template;
selecting one monitoring interface layout from the pre-generated monitoring interface layout template according to the monitoring scene to serve as the monitoring interface layout of the monitoring system; and
placing, by the monitoring system, the selected single display unit into a corresponding block of a monitoring interface layout of the monitoring system, and storing the same.

2. The mode setting method according to claim 1, wherein the display template comprises at least one of following charts:
a curve chart, a histogram, a pie graph, an instrument panel, an information panel, and a data report.

3. The mode setting method according to claim 1, further comprising:
adding a new display template into the preset display templates according to a requirement of the monitoring scene.

4. The mode setting method according to claim 1, before the combining, further comprising:
determining whether the plurality of selected blocks are capable of being combined into an m*n type regular pattern, where m and n are positive integers; and
if yes, combining the plurality of selected blocks.

5. The mode setting method according to claim 4, wherein the combining the plurality of selected blocks comprises:
providing a combining determination function button and a combining canceling function button;
in response to a clicking operation of the user on the combining determination function button, combining the plurality of selected blocks; or
in response to a clicking operation of the user on the combining canceling function button, abandoning combining of the plurality of selected blocks.

6. The mode setting method according to claim 4, further comprising:
under a condition that the plurality of selected blocks are determined not to be combined into the m*n type regular pattern, displaying prompt information not meeting a combining requirement, while allowing the user to continue to carry out the subsequent operation.

7. A mode setting device of a monitoring system, comprising:
one or more processors, and
a display coupled with the one or more processors, wherein the one or more processors are configured to:
select one or a plurality of monitoring objects, said monitoring objects including humidity, temperature, the number of personnel, a sign of personnel activity;
select a corresponding display template from preset display templates for each of the one or the plurality of monitoring objects, and associate and package each monitoring object and the selected display template in a one-to-one correspondence, and generate one or a plurality of single display units;
select a single display unit from the generated single display units according to a monitoring scene;
automatically generate an initial block layout of a monitoring interface;
select a plurality of adjacent blocks in the initial block layout;
combine the plurality of selected blocks according to a user's operation;
in response to a backspacing operation of the user, separate the combined blocks into initial blocks by implementing the backspacing operation to each block, so as to separate each block obtained after combining into the initial blocks;
generate a monitoring interface layout template;
select one monitoring interface layout from the pre-generated monitoring interface layout template according to the monitoring scene to serve as the monitoring interface layout of the monitoring system; and place the selected single display unit into a corresponding block of a monitoring interface layout of the monitoring system, and store the same.

8. The mode setting device according to claim 7, wherein the display template comprises at least one of following charts:

a curve chart, a histogram, a pie graph, an instrument panel, an information panel, and a data report.

9. The mode setting device according to claim 7, wherein the one or more processors are configured to:

add a new display template into the preset display templates according to a requirement of the monitoring scene.

10. The mode setting device according to claim 7, wherein the one or more processors are configured to:

before combining, determine whether the plurality of selected blocks are capable of being combined into an m*n type regular pattern, where m and n are positive integers; and if yes, combine the plurality of selected blocks.

11. The mode setting device according to claim 10, wherein the one or more processors are configured to:

provide a combining determination function button and a combining canceling function button;

in response to a clicking operation of the user on the combining determination function button, combine the plurality of selected blocks; or in response to a clicking operation of the user on the combining canceling function button, abandon combining of the plurality of selected blocks.

12. The mode setting device according to claim 10, wherein the one or more processors are configured to:

under a condition that the plurality of selected blocks are determined not to be combined into the m*n type regular pattern, display prompt information not meeting a combining requirement, while allowing the user to continue to carry out the subsequent operation.

* * * * *